Figure 1:
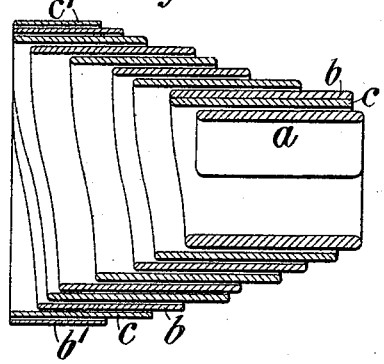

(No Model.)  5 Sheets—Sheet 1.

G. TURTON.
SPRING.

No. 516,360.  Patented Mar. 13, 1894.

Witnesses
Raphael Netter
James Catlow

Inventor
George Turton
by Duncan & Page
Attorneys.

(No Model.) 5 Sheets—Sheet 2.
G. TURTON.
SPRING.
No. 516,360. Patented Mar. 13, 1894.
Fig. 8.
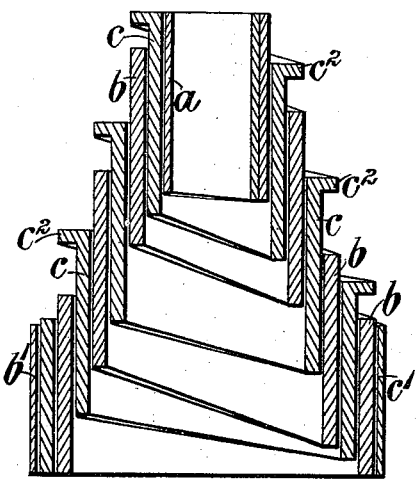
Fig. 10.
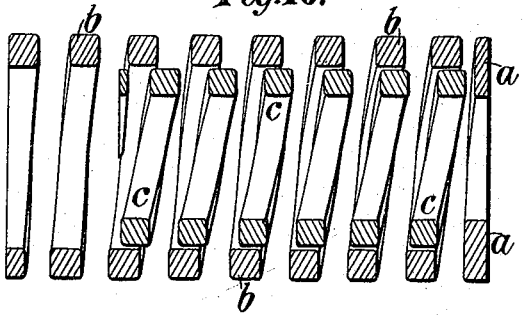
Fig. 11.
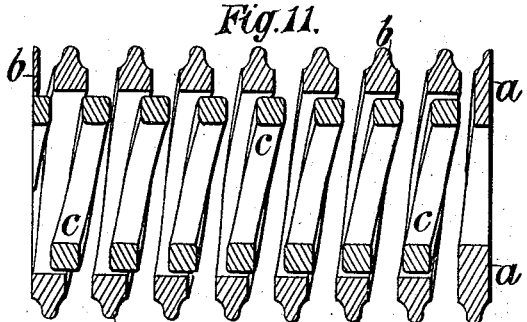
Fig. 9.
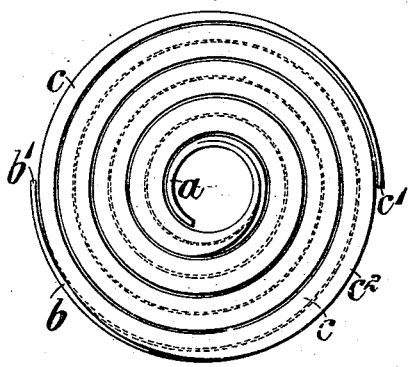
Fig. 12.
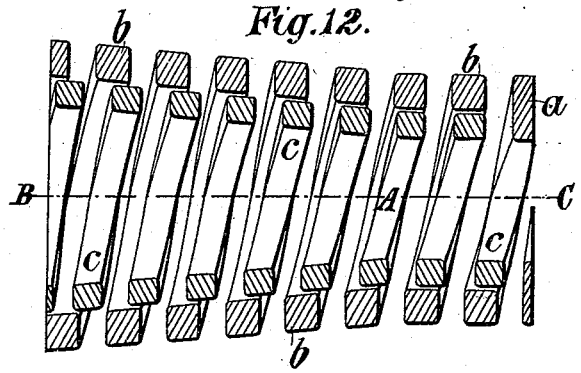
Fig. 13.
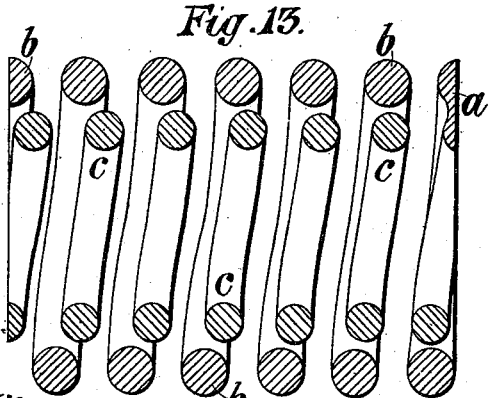
Fig. 13.ª
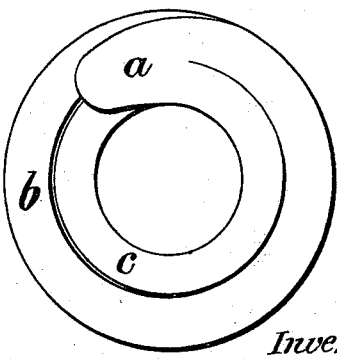
Witnesses:
Raphaël Netter
James Catlow
Inventor
George Turton
by Duncan & Page
Attorneys (No Model.) 5 Sheets—Sheet 3.
G. TURTON.
SPRING.
No. 516,360. Patented Mar. 13, 1894.
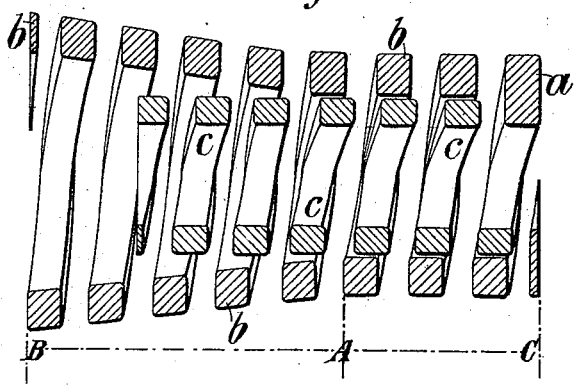
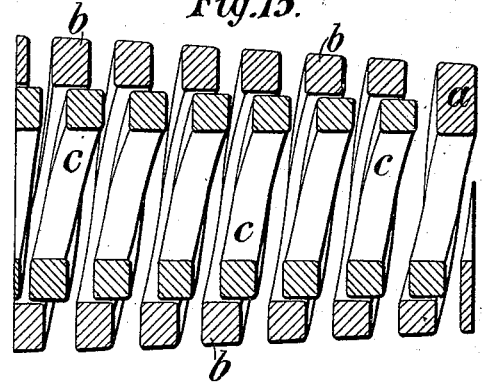
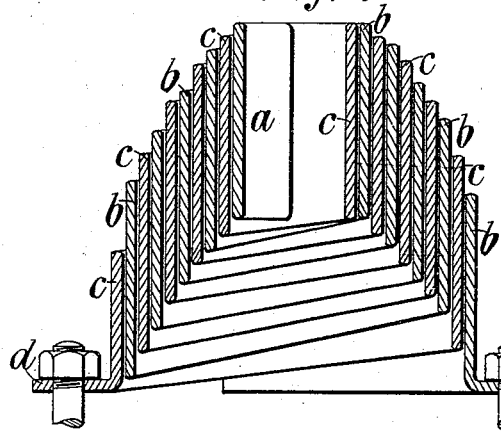
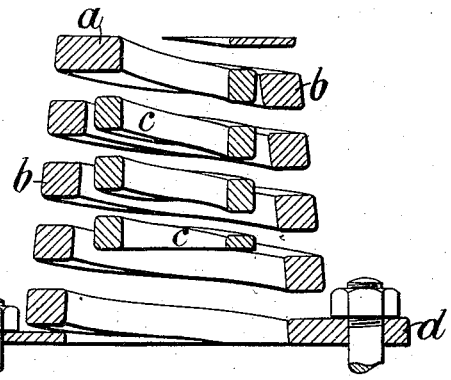
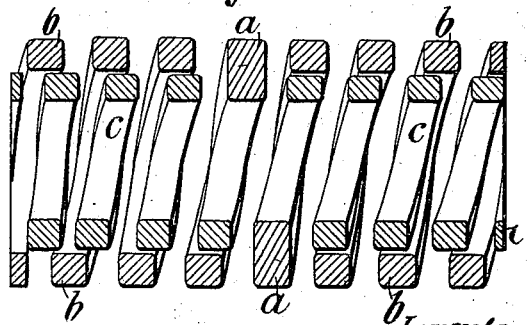
Witnesses:
Raphael Netter
James Catlow
Inventor
George Turton
by Duncan & Page
Attorneys (No Model.) 5 Sheets—Sheet 4.

G. TURTON.
SPRING.

No. 516,360. Patented Mar. 13, 1894.

Witnesses:
Raphael Netter
James N. Catlow

Inventor
George Turton
by Duncan & Page
Att'ys.

THE NATIONAL LITHOGRAPHING COMPANY,
WASHINGTON, D. C.

(No Model.) 5 Sheets—Sheet 5.

G. TURTON.
SPRING.

No. 516,360. Patented Mar. 13, 1894.

Witnesses:
Raphael Netter
James Catlow

Inventor
George Turton
by Duncan & Page Att'ys

UNITED STATES PATENT OFFICE.

GEORGE TURTON, OF SHEFFIELD, ENGLAND.

SPRING.

SPECIFICATION forming part of Letters Patent No. 516,360, dated March 13, 1894.

Application filed March 16, 1893. Serial No. 466,201. (No model.) Patented in England May 19, 1892, No. 9,565; in Germany July 22, 1892, No. 69,737; in France December 21, 1892, No. 226,568; in Belgium December 21, 1892, No. 102,630, and in Austria-Hungary March 6, 1893, No. 485.

*To all whom it may concern:*

Be it known that I, GEORGE TURTON, of the firm of George Turton, Platts & Co., engineers, a subject of the Queen of Great Britain, and a resident of Sheffield, England, have invented new and useful Improvements in Springs for Use in Railway-Buffers and for other Purposes, of which the following is a specification.

I have obtained patents for this invention in the following countries: Great Britain, No. 9,565, dated May 19, 1892; Germany, No. 69,737, dated July 22, 1892; France, No. 226,568, dated December 21, 1892; Belgium, No. 102,630, dated December 21, 1892, and Austria-Hungary, No. 485, dated March 6, 1893.

My invention relates to springs chiefly designed for use in railway-buffers. My improved springs are, however, also applicable for other purposes.

My invention consists partly in a compound or multiple spring composed of inner and outer coils connected or united at one point in their length and formed of bars of such relative length that they terminate at diametrically opposite points in the spring.

My said invention further consists in making such compound or multiple springs with a conical or taper portion and with a cylindrical portion, the latter serving to retain the spring in position on a buffer-plunger spindle or like support, and the conical or taper portion affording a base of comparatively large diameter.

In making my improved springs according to one method I proceed as follows, viz.: I take two or more metal bars of any suitable form and dimensions in transverse section and place the said bars side by side and weld them together at one end; I then coil the said bars so as to form a volute, conical or spiral spring or a combined conical and spiral spring as may be desired. I make the said bars of such length that they will terminate at different points in the circumference of the spring in order to afford a bearing on both sides of the spring at its wider end, and thus give greater steadiness or stability to the spring. The said bars are free to move relatively to each other in a direction parallel to the axis of the spring, except at or near the welded or united part. I sometimes so arrange the said bars that, when coiled, the outer bar more or less overlaps the inner bar. I can, with more or less advantage, weld the bars together at any other part of their length instead of at the ends. Moreover, instead of welding the bars, I sometimes secure them together at any desired part of their length by means of bolts, studs, rivets or the like. By fastening the bars together at any suitable point in their length as above mentioned, I provide for preventing displacement of the said bars relatively to each other. Moreover a spring thus made of two or more bars has greater resiliency than an ordinary spring of the same weight and can be more effectively tempered. I sometimes make the spring of two or more coils interlocked in such a manner that relative displacement of the said coils will be prevented without uniting them by welding, bolting or otherwise. For this purpose, I take suitably shaped bars tapered at one or both ends, and I place the said bars side by side and coil them simultaneously in such a manner as to produce a volute or conical spring, and so form them that they interlock without being rigidly united. And in other instances I coil the bars separately and then weld the same together or interlock them.

According to a further modification of my invention I make springs in such a manner as to preserve the advantages of the conical or volute springs while obviating the necessity of employing a dished washer for supporting the open end of the spring. For this purpose I make a taper or conical spring with an extension at its smaller end in the form of a parallel or cylindrical spiral, which will more or less accurately fit the stem or spindle of a railway-buffer plunger or other rod or spindle on which it is to be used; this parallel or cylindrical portion of the spring will maintain the spring on the rod or spindle in the required horizontal position without the aid of a dished washer or similar device at the open end or base of the tapered portion or cone. These springs can be made of bars of any desired form in transverse section; they are more elastic than the ordinary spiral springs, and the taper or conical part affords the advantages of a volute or conical spring, while the said springs produce less friction than the ordinary spiral springs. These springs are chiefly designed to be used in buffers the shanks of which extend through the frame of the vehicle. My improved springs can, however, be used for other purposes; for instance, as draw-bar springs or as bolster-springs for bogies.

In the accompanying drawings I have illustrated various forms or modifications of my said invention.

Figure 2:
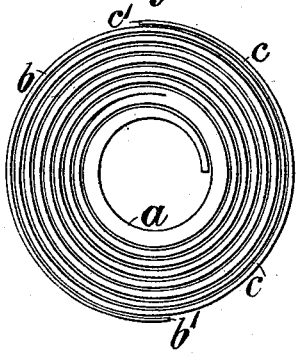
Figure 4:
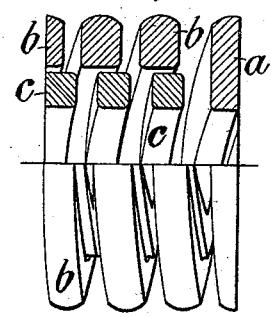
Figure 3:
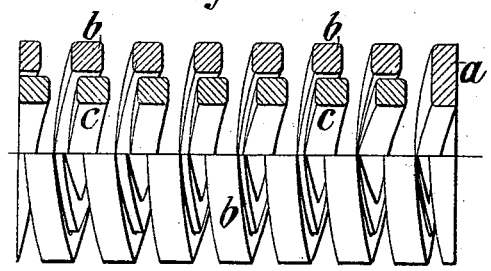
Figure 5:
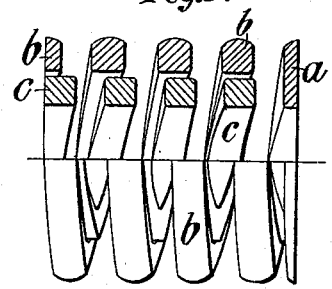
Figure 6:
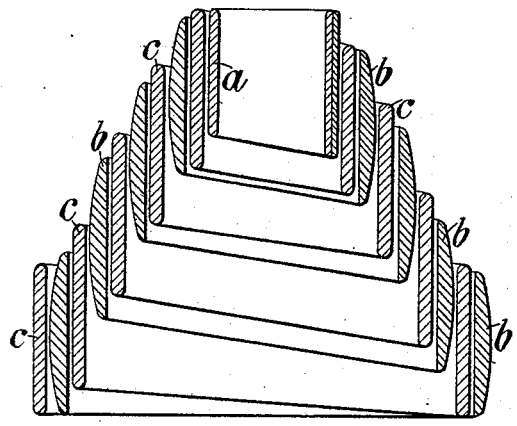
Figure 7:
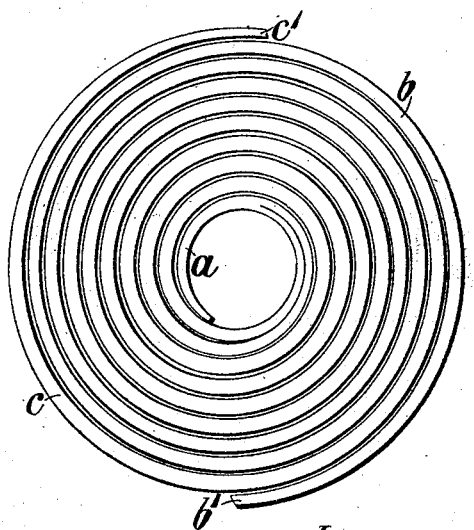
Figure 19:
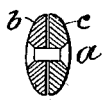
Figure 20:
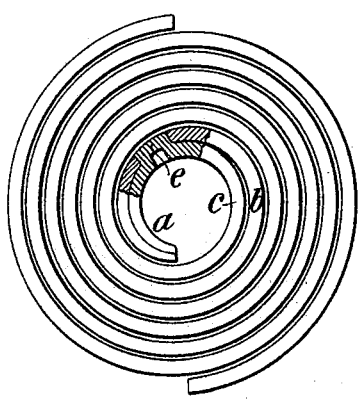
Figure 21:
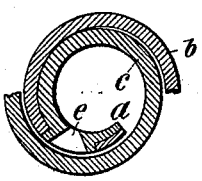
Figure 22:
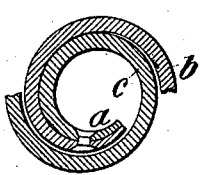
Figure 23:
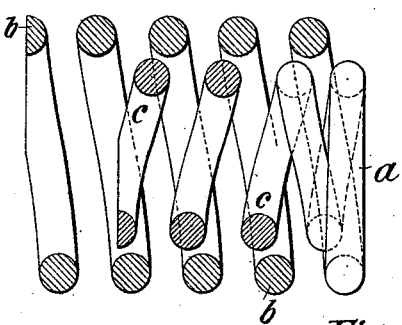
Figure 24:
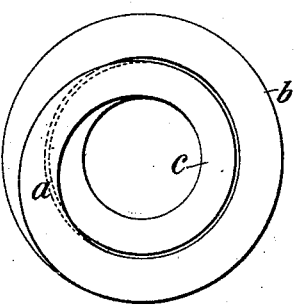
Figure 25:
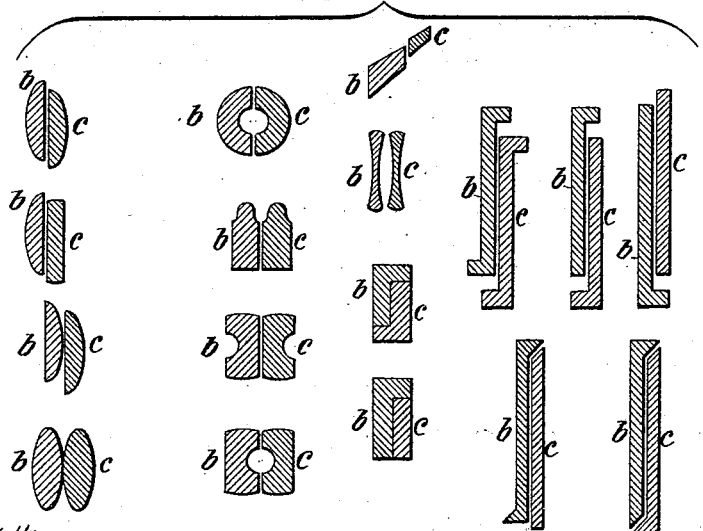
Figure 27:
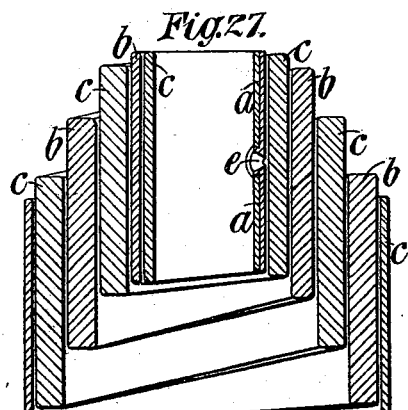
Figure 26:
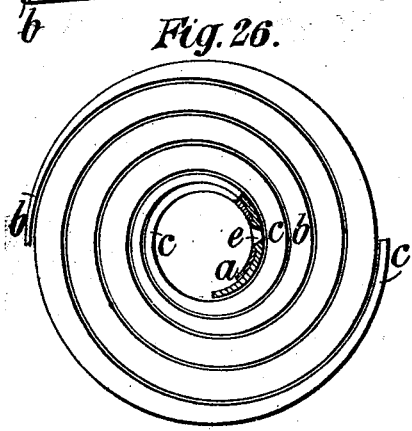
Figure 32:
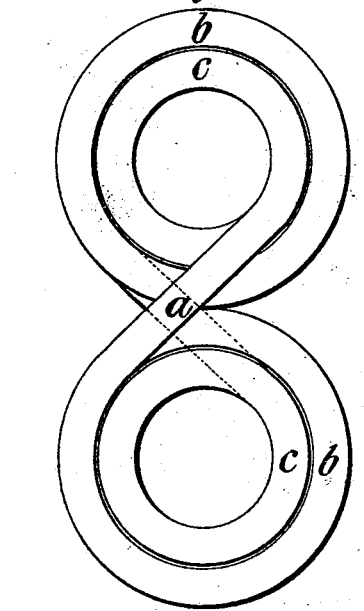
Figure 30:
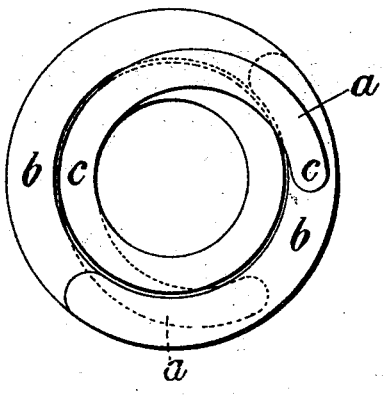
Figure 28:
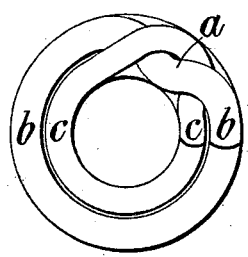
Figure 33:
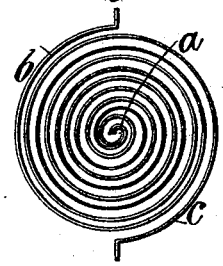
Figure 31:
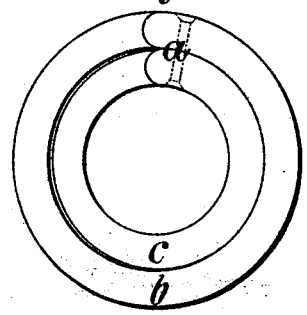
Figure 29:
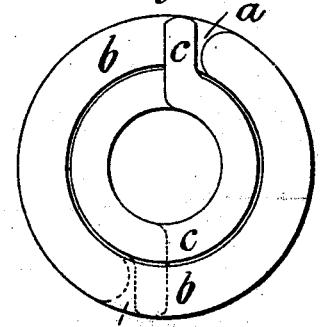

Figure 1 is a longitudinal central section, and Fig. 2 an end elevation of a compound or multiple volute buffer-spring constructed in accordance with my said invention. In this form of my spring, two flat bars $b$, $c$, of half the thickness ordinarily used are welded together at the end $a$ of the said spring and are tapered at both ends; they are then coiled into the required form. The said bars $b$, $c$ are of such relative length that the ends $b'$, $c'$ of the said bars terminate at opposite points of the circumference of the larger end or base of the volute spring. Moreover the said bars $b$, $c$ are so coiled as to partly overlap each other, that is to say, so that the outer bar $b$ does not completely cover the inner bar $c$. Fig. 3 is a side elevation partly in longitudinal central section of a compound or double cylindrical spiral spring suitable for use as a buffer-spring or for other purposes. The two bars $b$, $c$ of which it is composed are welded together at the end $a$ of the spring and coiled together, one coil or section being outside of and concentric with the other coil or section. Fig. 4 is a sectional elevation of a spring designed for use in connection with draw-bars; this spring has its outer coil or section heavier and stronger than its inner coil or section but in other respects is similar in construction to the spring shown in Fig. 3. Fig. 5 is a side elevation partly in section of another draw-bar spring for use in a frame or cradle such as is frequently used in connection with draw-bars. The construction of this spring is somewhat similar to that of the springs shown in Figs. 3 and 4. Fig. 6 is a longitudinal central section, and Fig. 7 an end elevation of a compound or double volute buffer-spring which differs somewhat from the spring shown in Figs. 1 and 2, the outer surface of the outer bar $b$ being slightly convex in transverse section. Fig. 8 is a longitudinal section, and Fig. 9 an end elevation of a compound volute spring similar to that shown in Figs. 1 and 2 with the exception that the inner bar $c$ is provided with a flange $c^2$ which projects over the outer bar $b$. Figs. 10 to 18 are longitudinal central sections showing further modifications of my invention. In Fig. 10 I have shown a compound cylindrical spiral spring the inner coil or section $c$ of which is shorter than the outer coil or section $b$ and acts as an extra-load spring, that is to say, a spring which only comes into action when the pressure applied to the spring is excessive and the outer coil is partially compressed. Fig. 11 shows a spring similar to that shown in Fig. 10 with the exception that both coils are of the same length and the inner and outer coils are of different shape and size in transverse section. Fig. 12 shows a compound spring having a conical or taper portion A—B and at the smaller end of the same a parallel or cylindrical portion A—C the interior coil of the parallel part being arranged to fit the stem or spindle of a buffer-plunger or the like so as to provide a suitable support for the spring, without the use of a dished washer or the like. Figs. 13 and 13ª show a compound cylindrical spiral spring in which the bars $b$ and $c$ are of circular form but of different area in transverse section, the two coils being of equal length. Fig. 14 shows a compound spring, the outer bar $b$ of which is so coiled as to form a conical portion A—B, and a parallel part A—C, at the smaller end thereof, and the inner bar $c$ is shorter than the outer bar $b$ and forms an extra-load spring, and is coiled cylindrically so as to fit more or less accurately, the stem or spindle of a buffer-plunger or the like. In Fig. 15 the spring is composed of two bars $b$ $c$ which taper from end to end, and are welded together at their thinner ends, and coiled together so that the interior of the said spring is cylindrical, while the exterior is conical. Fig. 16 shows a compound volute spring, provided with flanges or lugs $d$ at its larger end, by means of which it can be secured by bolts or the like to a suitable support. This spring may be inverted, if desired, and may be used for various purposes. Fig. 17 is a compound spring the outer bar $b$ of which is coiled conically, and the inner bar $c$ cylindrically, the inner coil being shorter than the outer coil, and the latter being provided with a flange $d$ or with lugs at its larger end for securing it to a suitable support. Fig. 18 shows a spring similar to that shown in Fig. 3, except that the two bars $b$ $c$ are welded together at or about the middle of their length, instead of at one end. Instead of welding the two bars together as above described, I sometimes unite them by means of rivets at any desired part of their length as shown in Fig. 19, or by means of bolts and nuts. Fig. 20 is an end elevation partly in section of a compound volute spring, and Figs. 21 and 22 are transverse sections of the smaller ends of compound volute springs, in which the bars $b$ $c$ are not welded together, but other suitable devices are provided for retaining the coils or sections in their proper relative position. For instance, in Fig. 20, a projection $e$ is formed on the outside of one end of the inner bar $c$, which projection fits into a corresponding hole in the end of the outer bar $b$. In Fig. 21 a tubular projection $e$ is formed on the inner bar $c$ and fits into a countersunk hole in the end of the outer bar $b$, the projection $e$ being then expanded or clinched over by driving into it a taper punch or other suitable tool. In Fig. 22, the ends of the bars b c are connected by a rivet at a. Fig. 23 is a sectional elevation, and Fig. 24 an end elevation of a compound cylindrical spiral spring in which the two coils or sections are of an opposite pitch to each other and are united at a the interior coil c being shorter than the outer coil b and forming an extra-load spring. In Fig. 25 I have shown various combinations of bars of different form in transverse section, which may be advantageously used in the manufacture of my improved springs, the said bars if desired being welded or otherwise united at any suitable point in their length, or being suitably interlocked. Fig. 26 is a plan partly in horizontal section, and Fig. 27 a vertical central section showing another form of compound volute spring in which the bars b c are united by means of a projection e formed on one bar and fitted into a hole in the other bar, which projection is afterward clinched over as shown. Fig. 28 is an end view of a compound spiral spring in which the coils b c are united by twisting the ends together, as at a. Figs. 29 and 30 are end views showing two forms of spiral spring in which the ends of the coil c are turned over the ends of the coil b, in such a manner that they interlock at a, and thus relative displacement of the coils is prevented. Fig. 31 is an end view of a spiral spring in which the coils b c are united by a rivet at a. Fig. 32 is an end view of two compound or multiple spiral springs so constructed and combined that the outer coil b of each of the said compound springs is united at a to the inner coil c of the other compound spring. I sometimes make a watch or clock spring according to my invention with two or more coils united at one end, as shown at a in Fig. 33, which spring may be arranged to act upon the barrel at two or more points in its circumference.

What I claim is—

1. A compound or multiple spring consisting of inner and outer coils connected or united at one point in their length substantially as described, and formed of bars of such relative length that they terminate at diametrically opposite points in the spring, as and for the purposes above specified.

2. A volute spring consisting of inner and outer coils formed of bars tapered at both ends, which bars are connected or united at one end and are of such relative length that they terminate at diametrically opposite points in the spring and thus form a stable base therefor, substantially as and for the purpose above specified.

3. A compound or multiple spring consisting of the coils b c connected or united at a, and terminating at diametrically opposite points b' c', substantially as and for the purposes above specified.

4. A spring consisting of inner and outer coils united at one point in their length, and having a conical or taper portion A—B and a parallel or cylindrical portion A—C at the smaller end thereof, substantially as hereinbefore described.

GEORGE TURTON.

Witnesses:
JOHN T. KNOWLES,
A. G. WEAVER.